(12) United States Patent
Fleurence et al.

(10) Patent No.: US 10,766,414 B2
(45) Date of Patent: Sep. 8, 2020

(54) MOTOR-VEHICLE OPTICAL SYSTEM

(71) Applicant: VALEO VISION, Bobigny (FR)

(72) Inventors: Thierry Fleurence, Bobigny (FR);
Kaoutar Ez-Zouaq, Bobigny (FR);
Nicolas Boiroux, Bobigny (FR); Nirina Rasoldier, Bobigny (FR); Jingjing Xue, Bobigny (FR); Arnaud Robert, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/369,713

(22) Filed: Mar. 29, 2019

(65) Prior Publication Data
US 2019/0299853 A1    Oct. 3, 2019

(30) Foreign Application Priority Data
Mar. 30, 2018    (FR) ...................... 18 52823

(51) Int. Cl.
| | |
|---|---|
| *B60Q 3/74* | (2017.01) |
| *F21V 8/00* | (2006.01) |
| *F21V 5/04* | (2006.01) |
| *B60Q 3/60* | (2017.01) |
| *F21V 5/00* | (2018.01) |

(Continued)

(52) U.S. Cl.
CPC .................. *B60Q 3/74* (2017.02); *B60Q 3/60* (2017.02); *B60Q 3/76* (2017.02); *F21V 5/008* (2013.01); *F21V 5/04* (2013.01); *F21V 5/048* (2013.01); *F21V 23/04* (2013.01); *G02B 6/005* (2013.01); *F21Y 2105/12* (2016.08); *F21Y 2105/14* (2016.08); *F21Y 2115/10* (2016.08)

(58) Field of Classification Search
CPC .... B60Q 3/74; B60Q 3/76; B60Q 3/60; F21V 5/048; F21V 23/04; F21V 5/008; F21V 5/04; G02B 6/005; F21Y 2105/14; F21Y 2105/12; F21Y 2115/10
See application file for complete search history.

(56) References Cited

U.S. PATENT DOCUMENTS

| | | | |
|---|---|---|---|
| 2003/0174499 A1 | 9/2003 | Bohlander | |
| 2016/0161077 A1* | 6/2016 | Albou | B60Q 1/143 362/509 |

(Continued)

FOREIGN PATENT DOCUMENTS

| | | |
|---|---|---|
| DE | 10 2007 053 186 A1 | 5/2009 |
| DE | 10 2015 115 579 A1 | 3/2017 |

(Continued)

OTHER PUBLICATIONS

Hiki, Japanese Patent Application Publication, jp, 2011-148346, Aug. 2011 machine translation (Year: 2011).*

(Continued)

*Primary Examiner* — Tracie Y Green
(74) *Attorney, Agent, or Firm* — Oblon, McClelland, Maier & Neustadt, L.L.P.

(57) ABSTRACT

An optical system including two optical modules, each optical module including at least one light source, one primary optical element configured to form an elementary beam dependent on the rays emitted by the one or more light sources, and one secondary optical element for projecting the elementary beam. The primary optical elements of the optical modules form one and the same part.

17 Claims, 2 Drawing Sheets

(51) Int. Cl.
*F21V 23/04* (2006.01)
*B60Q 3/76* (2017.01)
*F21Y 115/10* (2016.01)
*F21Y 105/12* (2016.01)
*F21Y 105/14* (2016.01)

(56) References Cited

U.S. PATENT DOCUMENTS

2017/0240105 A1    8/2017  Lecorre et al.
2017/0241606 A1    8/2017  Courcier et al.
2019/0299851 A1*  10/2019  Fleurence ................ B60Q 3/74

FOREIGN PATENT DOCUMENTS

EP    3 208 530 A1    8/2017
EP    3 210 829 A1    8/2017
JP    2004-284511    10/2004
JP    2011-148346    8/2011

OTHER PUBLICATIONS

Machine translation of French written opinion (Year: 2018).*
Henrich, DE102015115579A1_machine translation_Mar. 2017 (Year: 2017).*
FR_3079474_A1 written opninion (Year: 2018).*
French Preliminary Search Report dated Nov. 19, 2018 in French Application 18 52823, filed on Mar. 30, 2018 (with English Translation of Categories of Cited Documents).

* cited by examiner

MOTOR-VEHICLE OPTICAL SYSTEM

The present invention relates to an optical system, and for example to an interior lighting system of a motor vehicle, able to project pixelated light beams, and forming an assembly for projecting pixelated images.

Pixelated images may in particular be formed by way of an optical system comprising a plurality of optical modules respectively intended to emit longitudinally forward an elementary beam in order to form, in front of the optical system, a final light beam forming the pixelated image and composed of the superposition or the junction of a plurality of these elementary beams. Each module generally comprises at least one matrix array of primary light sources, a plurality of light guides and a projecting optic.

Within each optical module, it is necessary to ensure the position with respect to one another of the various optical components, and in particular of the sources and of the guides with respect to the projecting optic, in order to project from the module a clear pixelated image. It is also necessary, in so far as the beams output from each module must be contiguous or superposed to form a clear pixelated image, to ensure the position of the optical modules with respect to one another, and therefore the position of the various optical components of a first optical module with respect to the various optical components of a neighbouring second optical module. It will be understood that the assembly time of optical systems intended to produce a pixelated image may be long in order to ensure each of the optical components is correctly positioned.

In another known arrangement, optical modules such as described above may be associated with reflecting means forming at least one exit reflector in order to achieve indirect imaging, for example, at least one planar, concave or convex mirror or a digital micromirror device. Such a reflector is able to receive and to reflect at least one light beam before it exits, the light beam being emitted and shaped by a matrix array of light sources associated with light guides then concentrated, in a first direction, by an additional projecting lens. The reflector serves to deviate, relative to the first direction, the light beam in a second direction that is oriented toward the glazed exit surface of the corresponding optical system.

It will be understood that the problems of bulk and of the multiplicity of the components become even larger in optical systems aiming to generate pixelated images and comprising, to this end, a plurality of optical modules. As a result, it may be difficult to integrate optical systems for generating pixelated images into motor vehicles and in particular into the passenger compartment of these vehicles with a view to an interior lighting application.

The invention is applicable in this context and aims to improve the quality of pixelated images projected by optical systems, and in particular by the optical systems employed in a motor-vehicle passenger compartment to produce interior lighting beams. To this end, the invention proposes an optical system that allows a pixelated light beam of good resolution to be emitted via a simplified and flexible arrangement of low bulk that is in particular compatible with the limited space in a passenger compartment when the optical system consists of an interior lighting system.

The subject of the invention is an optical system for lighting a zone of the passenger compartment of a motor vehicle comprising two optical modules, each optical module comprising at least one light source, one primary optical element configured to form an elementary beam dependent on the rays emitted by the one or more light sources, and one secondary optical element for projecting the elementary beam.

According to one feature of the invention, the primary optical elements of the optical modules form one and the same part. It will be understood, according to the invention, that the primary optical elements are made from the same material in order to form a single piece that extends over both of the optical modules.

Thus, the precise positioning of one of the primary optical elements with respect to the other is simplified. Furthermore, it should be noted that the optical modules respectively comprising one of these primary optical elements are found in one and the same optical system, so that the elementary beam projected by one of the optical modules must be coherent with respect to the projection of the elementary beam projected by the other of the optical modules. Thus, the precise positioning of the primary optical elements allows a high-resolution pixelated image to be produced with projected elementary beams that complement each other perfectly.

According to one feature of the invention, the optical modules are arranged to operate in a direct imaging mode, with a direct stack of the light sources and of the primary members.

According to features of the invention, provision may be made for each optical module to comprise a plurality of light sources that are selectively activatable and primary members that are respectively arranged facing one of the light sources in order to collect and guide the rays emitted by the corresponding source, the primary optical element being placed at the exit of the primary members. Furthermore, in this context, the primary members and the primary optical elements may form one and the same part for the two optical modules.

According to one feature of the invention, the optical modules may be configured so that the two projected elementary beams superpose at least partially in said zone of the passenger compartment.

According to a first embodiment of the invention, the optical modules are configured so that the two projected elementary beams that superpose at least partially have complementary shapes, the shape of a first elementary beam being the negative of the other elementary beam when all the light sources are activated.

According to a second embodiment of the invention, the optical modules are configured so that the two projected elementary beams that superpose at least partially have complementary shapes in that, when all the light sources are activated, the zones illuminated by a first elementary beam superpose with the dark zones of the other elementary beam, at least one zone illuminated by the first elementary beam moreover extending so as to partially cover at least one zone illuminated by the other elementary beam, said at least one zone neighbouring the dark zone of this elementary beam that the at least one zone illuminated by the first elementary beam covers.

According to a series of features of the optical system, which are able to be implemented alone or in combination, provision may be made for:
  the optical modules to respectively have an optical axis and to be arranged so that their optical axes are not parallel to each other and converge towards each other,
  the optical axes of the optical modules to be inclined with respect to each other by an angle of value comprised between 0.5° and 3°, the optical axes of the optical modules to be inclined with respect to a vertical axis of the vehicle by an angular value comprised between 5° and 15°, each optical module to have an extent comprised, in a longitudinal direction parallel to the optical axis of this optical module, between 15 and 25 mm.

According to another feature of the invention, provision may be made for the secondary optical elements of the two optical modules to form one and only one part.

According to another feature of the optical system, provision may be made for the primary members of a first optical module to be arranged to form a first matrix array and the primary members of a second optical module to be arranged to form a second matrix array, the first and second matrix arrays being of complementary shapes.

According to various features of the optical system according to the invention, which are implementable alone or in combination, provision may be made for:

the light sources to be light-emitting diodes, which may be able to be mounted on the surface of a printed circuit board, the primary and secondary optical elements to be configured to form, in the elementary beam, a trapezoidal image of each of the exits of the primary members, a plurality of primary members to have a cross section of square shape, a plurality of primary members to have a cross section of round shape, the shape of the primary members to differ from one optical module to the next.

Other features and advantages of the invention will become more clearly apparent on reading the detailed description of embodiments of the invention, which is given below by way of illustrative and nonlimiting example with reference to the appended figures, in which the optical system according to the invention, which is able to emit a pixelated light beam, has been illustrated, and in which.

Figure 4:
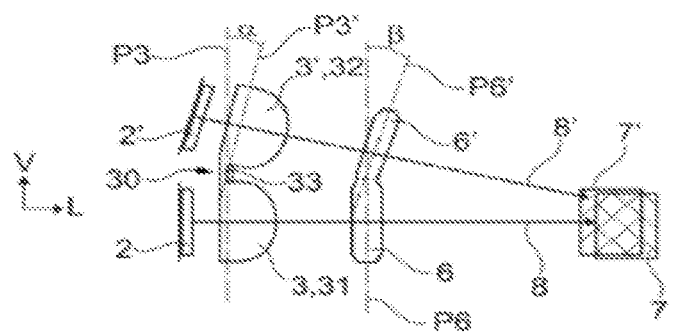
Figure 5:
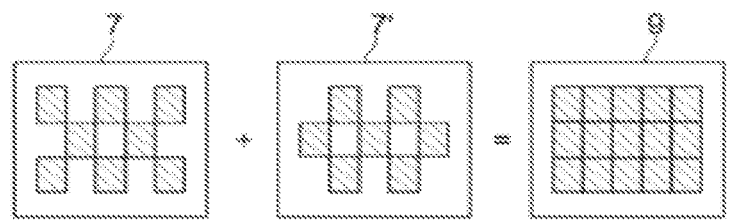

FIG. 4 is a schematic representation of the optical system of the invention, seen from the side in order to make the inclination of the component optical elements of the two optical modules with respect to each other more particularly visible; and FIG. 5 is a schematic view of the complementarity of the shapes of two elementary light beams projected as output from the component optical modules of the optical system, and that, according to one feature of the invention, superpose at least partially to deliver a pixelated image.

Although the figures illustrate the invention in detail with regard to implementation thereof, they may, of course, be used to better define the invention where appropriate. Likewise, it will be recalled that elements that are the same have been referenced with the same references in all of the figures. It will also be understood that the embodiments of the invention illustrated in the figures are given by way of nonlimiting example. Therefore, the optical system according to the invention may be configured differently, in particular by varying the arrangement and dimensions of the primary elementary light sources, of the primary optical element (in particular of the primary members), and of the secondary optical element.

Figure 2:
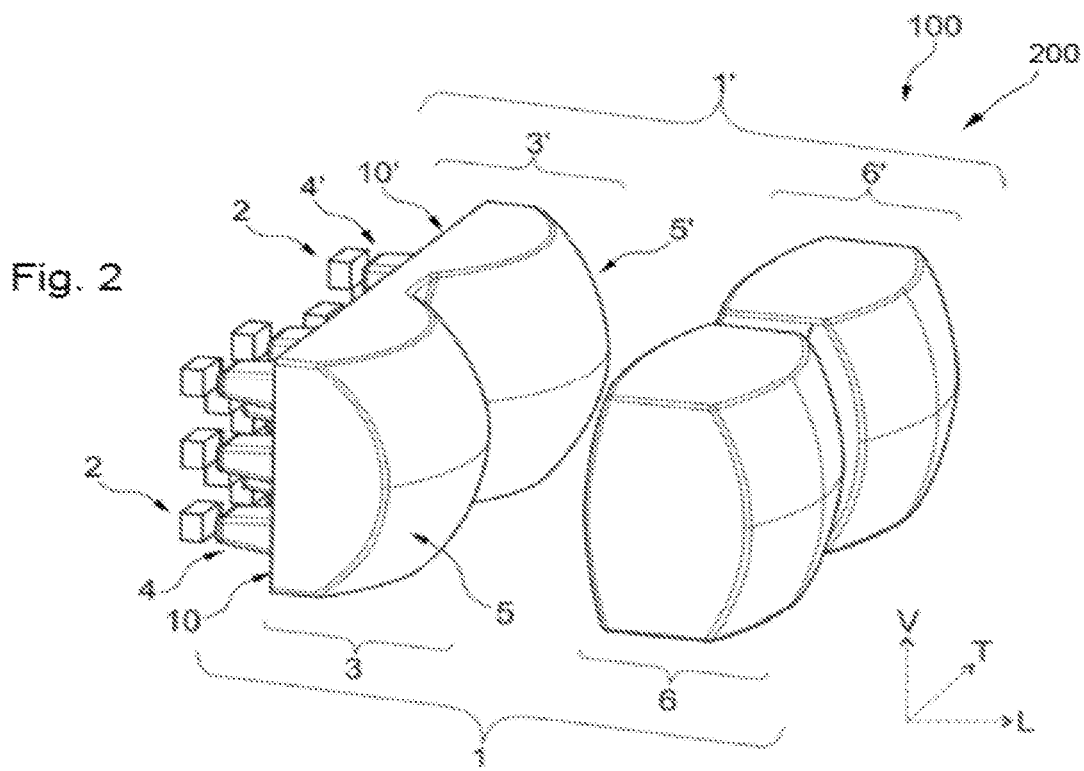
FIG. 2 is a perspective view of the optical system of the invention with the component optical modules of this optical system in a first arrangement.
Figure 3:
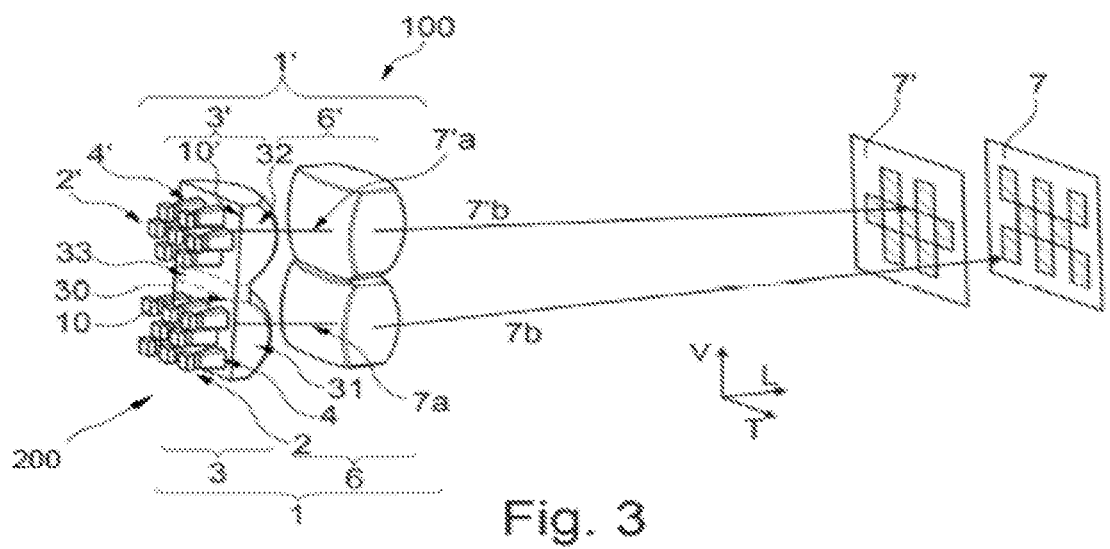
FIG. 3 is a perspective view from behind of the optical system of the invention with the component optical modules of this optical system in a second arrangement, this view allowing the elementary light beams that are projected by each of these modules so as to superpose to be seen.

In the rest of the description, with reference in particular to the axis system L, V, T present in FIGS. 2 to 4, the following orientations will be adopted nonlimitingly:

longitudinal L, defined by a longitudinal axis of elongation of the optical system of the invention that allows a back to front arrangement of its component elements and in particular of a plurality of light sources, of a primary optical element and of a secondary optical element, to be defined;

vertical V, with reference to a vertical axis perpendicular to the ground over which the vehicle is being driven; and transverse T, with reference to an axis perpendicular to the longitudinal and vertical axes described above in a direction substantially parallel to the ground over which the vehicle is being driven.

Figure 1:
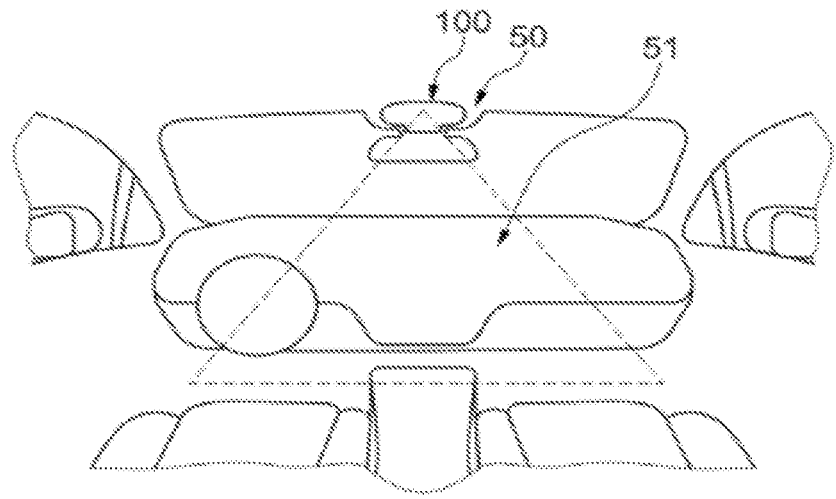
FIG. 1 illustrates one possible mode of integration of the optical system according to the invention into the passenger compartment of a motor vehicle.

FIG. 1 illustrates the installation of an optical system 200 in a motor-vehicle passenger compartment with a view to forming an interior lighting system 100 that is configured to light the passenger compartment in a reading-light type application and placed to this end, for example, in the central front ceiling light 50 of the vehicle. In this configuration, the interior lighting system 100 is configured to project elementary light beams that superpose at least partially, such as will be described in more detail below, in order to form at least one lighting zone 51 that will possibly extend over an area, for example an area of a glazed surface of the vehicle, or a volume that will possibly contain, for example, the dashboard and the base of the front seats of the vehicle.

It will be understood that the optical system 200 may be installed in the vehicle differently and in particular in other locations in the passenger compartment, for example in a central rear ceiling light, laterally above the doors (for example level with the assist handles) or even in a central front and/or rear console.

Such as will be described, the optical system 200 according to the invention comprises light sources the selective activation of which allows elementary beams that are able to vary over time, in their periodicities, their intensities and/or their colours to be generated so as to form, in at least one zone of the passenger compartment, at least one clear static and/or dynamic pixelated image such as, for example, a background image, a logo or even a pictogram.

FIG. 2 illustrates the optical system 200, here able to form an interior lighting system 100, in which two optical modules 1, 1' are arranged side-by-side, here in a transverse direction. According to the invention, each optical module 1, 1' comprises, from back to front along a longitudinal axis, a plurality of light sources 2, 2', a primary optical element 3, 3' and a secondary optical element 6, 6' that are configured to allow an elementary beam 7, 7' (shown in FIG. 3) to be projected into a zone of the passenger compartment.

The primary optical element 3, 3' comprises a rear portion in which primary members 4, 4' that are respectively arranged facing the light sources 2, 2' are found and a front portion that forms a lens 5, 5'.

The light sources 2, 2' are generally light-emitting diodes (LEDs) mounted on the surface of a printed circuit board (not shown here) and that may be controlled individually. Because of its application to a motor-vehicle passenger compartment, the space dedicated to the installation of the interior lighting system is limited. Thus, it is necessary to employ light sources of small size, which may for example be surface-mount-device (SMD) LEDs or indeed chip-on-board (COB) LEDs.

The primary optical element 3, 3', arranged in front of the light sources 2, 2' so as to be located on the path of the rays emitted by these light sources, is able to modify the distribution of these emitted rays. To this end and such as illustrated, the primary members 4, 4' found in the rear portion of the primary optical element may respectively take the form of a light guide, the light guides thus formed together forming a pixelated optical system.

The light guides extend on the whole longitudinally and have, at opposite longitudinal ends, a face through which the light rays emitted by the light sources 2, 2' enter and a face through which these light rays exit. The light guides may have a cross section of square, rectangular and/or round shape, it being understood that the shape of the light guides may be identical or different within a given optical module 1, 1'. Each light guide is coupled to one light-emitting diode so that most of the light rays emitted by one light-emitting diode penetrates into the light guide that is dedicated thereto via an entrance face of this guide and are guided to the corresponding exit face through which the rays formed into a narrower pencil beam forming a square or rectangular or even round pixel exit.

The lens 5, 5' forming the front portion of the primary optical element 3, 3' comprises a planar entrance dioptric interface 10, 10' and an exit face of substantially hemispherical profile. Each lens 5, 5' of a primary optical element 3, 3' may thus take the form of a convergent plano-convex lens. The primary members 4, 4', each formed by one light guide, are arranged protruding from the planar entrance dioptric interface 10, 10' so that the exit face of each guide is placed in the plane of the planar entrance dioptric interface.

The primary members 4, 4' may be produced separately from the primary optical element 3, 3' forming the lens 5, 5'. However, in one preferred embodiment of the invention, the primary members 4, 4' form, with the primary optical element 3, 3' of at least one optical module 1, 1', one and only one part. In the illustrated example, each module 1, 1' comprises a primary optical element 3, 3' and primary members 4, 4' that are one part, and the two primary optical elements 3, 3' and the integrated primary members 4, 4' may form one and only one part common to the two optical modules 1, 1'.

Thus, although rendered distinct from each other by the specific arrangement of the light guides that they manage and the light beams that the activation of the light sources that are specific thereto may generate, the primary optical elements 3, 3' of the optical modules 1, 1' may together form one and only one part 30. In this single part, the primary optical elements 3, 3' respectively form first and second optical zones 31, 32 that are separated from each other by an optically neutral linking zone 33 that is not or hardly passed through by the light rays emitted by the light sources 2, 2'.

More particularly, this substantially planar linking zone 33, which separates the two optical zones 31, 32, which each take the form of a spherical lens such as defined above, is more particularly visible in FIG. 2.

The configuration of the optical system 200, and more particularly the position of the primary optical element 3, 3' that forms the lens 5, 5' and of the projecting secondary optical element 6, 6', is such that the exit faces of the light guides found in the plane of the planar entrance dioptre 10, 10' are placed substantially in the object focal plane of the projecting secondary optical element 6, 6'.

The projecting secondary optical element 6, 6' here forms an additional lens, which is preferably biconvex, and which is able to concentrate exit-side an adaptive elementary light beam 7, 7' along an optical axis 8, 8' (shown in FIG. 3) set depending on the arrangement and orientation of this secondary optical element and of the set of optical components of the corresponding optical module, with a view to projecting an image of the light sources 2, 2' longitudinally forward.

Advantageously, the primary optical elements 3, 3' and secondary optical elements 6, 6' are configured to form, in the elementary beam 7, 7', a trapezoidal image of each of the exits of the light guides forming the primary members 4, 4'.

In the example illustrated in FIG. 2, and similarly to what was described with respect to the primary optical elements, the secondary optical elements 6, 6' of the two optical modules 1, 1' form one and only one part 60, it being understood that the additional lenses of the secondary optical elements 6, 6' may have different optical configurations and/or inclinations from each other.

Because of the constraints on bulk described above in the case of application to an interior lighting system, the longitudinal dimensions of the optical system that comprises the two optical modules 1, 1' must be substantially about 20 mm. To allow all of the components of the optical system to be integrated into this space, the optical modules 1, 1' are arranged so as to operate in a direct-imaging mode, with a direct stack along the longitudinal axis of the light sources 2, 2', of the primary members 4, 4', of the primary optical elements 3, 3' and of the secondary optical elements 6, 6'.

In one preferred implementation of the optical system 200, each optical module 1, 1' has, in a longitudinal direction parallel to the optical axis 8, 8', an extent comprised between 15 and 25 mm.

FIG. 3 illustrates an optical system 200 according to the invention forming an interior lighting system 100 and the component optical modules of which have a particular arrangement. More particularly, the two optical modules 1, 1' are here superposed on each other in a vertical direction. This arrangement in no way modifies the number and nature of the components of the optical modules 1, 1' which, as described above, each comprise, from back to front, a plurality of light sources 2, 2', a primary optical element 3, 3' forming a lens 5, 5' and associated with primary members 4, 4' respectively facing one of the light sources and a secondary optical element 6, 6' forming an additional lens for projecting an elementary beam 7, 7' into a zone of the passenger compartment.

In FIG. 3, similarly to what was described above with reference to FIG. 2, the primary optical elements 3, 3' of the optical modules are formed of one and the same part, as are the secondary optical elements 6, 6', and FIG. 3 illustrates the fact that the optical modules may be placed in any orientation provided that, such as will be described below, the primary and secondary optical elements of each optical module are configured so that the elementary light beams that they participate in projecting superpose at least partially.

Moreover, FIG. 3 allows the optical system to be seen from a viewing angle different from that of FIG. 2, which allows one of the ways in which the modules differ from each other, namely in the layout of the primary members protruding from the entrance face of the lens that forms part of the primary optical element, to be better seen.

Each optical module comprises primary members, or light guides, respectively facing one light source and arranged in three rows.

In the first optical module 1, eight primary members are arranged in three rows, with three primary members in the first row, two primary members in the second row, and again three primary members in the third row. The light guides arranged in one and the same row are spaced apart from each other, with a transverse spacing, i.e. a spacing in the direction of the series of guides in the row, substantially equal to the transverse dimension of a light guide level with the planar entrance dioptric interface of the primary optical element. Furthermore, the light guides are offset transversely from one row to the next so as to have a staggered layout, with a transverse offset of one row in two.

In the second optical module 1', seven primary members are arranged in three rows, with two primary members in the first row, three primary members in the second row, and again two primary members in the third row. As was described with respect to the first optical module, the light guides arranged in one and the same row are spaced apart from each other, with a transverse spacing, i.e. a spacing in the direction of the series of guides in the row, substantially equal to the transverse dimension of a light guide level with the planar entrance dioptric interface of the primary optical element. Furthermore, the light guides are offset transversely from one row to the next so as to have a staggered layout, with a transverse offset of one row in two.

The orientation of FIG. 3 furthermore allows the projected elementary light beams to be schematically illustrated, it being understood that what will be said below with reference to the arrangement of the optical modules of FIG. 3 also goes for other arrangements and in particular the arrangement illustrated in FIG. 2.

FIG. 3 shows, for each of the optical modules 1, 1', the path of a ray emitted by a light source 2, 2' and that passes in succession through a primary member 4, 4', the front portion of the associated primary optical element 3, 3' and then the associated secondary optical element 6, 6'.

According to the invention, the optical modules 1, 1' are configured so that the two elementary light beams 7, 7' projected as output from the secondary optical elements 6, 6' superpose at least partially in order to create, in a zone of the passenger compartment, a pixelated image 9 as illustrated in FIG. 5. To obtain the superposition of the projected elementary light beams 7, 7', the optical modules 1, 1' are arranged so that their optical axes 8, 8' are not parallel with respect to each other and converge towards each other. To this end, the additional lenses of the secondary optical elements 6, 6', and/or the lenses 5, 5' forming the front portion of the primary optical elements 3, 3', and/or the primary optical elements in their entirety, may have different optical configurations and/or inclinations from each other with a view to ensuring a deviation of at least one elementary light beam 7, 7' and to achieving the convergence of the two elementary light beams 7, 7' toward each other.

In the illustrated embodiment, a ray emitted by a first light source 2 of the first optical module 1 propagates via successive reflections through the first primary member 4 arranged facing the first light source, and exits via the exit dioptric interface of the first lens 5 from the first primary optical element 3 in a first direction 7*a*, toward the first secondary optical element 6. This first secondary optical element 6 that forms an additional lens ensures, via its shape and its arrangement in the passenger compartment, the deviation of the ray in a second direction 7*b*, which is inclined with respect to the first direction 7*a*. All of the rays emitted by the first light sources 2 associated with the first optical module 1 thus form a first elementary light beam 7 that is projected into the passenger compartment.

Similarly, a ray emitted by a second light source 2' of the second optical module 1' propagates via successive reflections through the second primary member 4' arranged facing the second light source, and exits via the exit dioptric interface of the second lens 5' from the second primary optical element 3' in a third direction 7'*a*, toward the second secondary optical element 6'. This second secondary optical element 6' that forms an additional lens ensures, via its shape and its arrangement in the passenger compartment, the deviation of the ray in a fourth direction 7'*b*, which is inclined with respect to the third direction 7'*a*. All of the rays emitted by the second light sources 2' associated with the second optical module 1 thus form a second elementary light beam 7' that is projected into the passenger compartment.

It is possible to arbitrarily define the longitudinal axis of the optical system to be coincident with the optical axis of the first optical module 1. The components of the first optical module 1 are placed with respect to each other so that the rays emitted by the first light sources allow a projection along this first optical axis into a set zone of the passenger compartment. Either the primary optical element or the secondary optical element of the second optical module has an inclination with respect to the primary optical element/the secondary optical element of the first optical module, respectively, in order to make it possible for the rays emitted by the second light sources of the second optical module, and therefore from a position offset transversely (FIG. 2) or vertically (FIG. 3) with respect to the given position of the first light sources of the first optical module, to be projected into the same set zone of the passenger compartment.

In other words, and such as schematically shown in FIG. 4, giving this time a side view, the second primary optical element 3' and/or the second secondary optical element 6' mainly lie in planes of extension P3', P6' that are inclined with respect to the planes of extension P3, P6 in which the first primary optical element 3 and/or the first secondary optical element 6 lie. In FIG. 4, by way of nonlimiting example, the planes of extension of the primary optical elements 3, 3' are inclined with respect to each other by a first angle c and the planes of extension of the secondary optical elements 6, 6' are inclined with respect to each other by a second angle 3, it being understood that the inclination illustrated here is accentuated in order to make it easier to see in the figure.

It will be understood that, in this example embodiment, the second elementary beam 7' of the second optical module 1', which is deviated with respect to the optical axis 8', converges toward the optical axis 8 and superposes with the elementary beam 7 of the optical module 1 in order to create a pixelated final image 9. In one preferred embodiment of the invention, the optical axes 8, 8' of the optical modules 1, 1' are inclined with respect to each other by an angle of value comprised between 0.5° and 3°. Furthermore, the optical axes 8, 8' of the optical modules 1, 1' may be inclined with respect to a vertical axis of the vehicle, i.e. an axis substantially perpendicular to the main plane defined by the roof and/or the floor of said vehicle, by an angular value comprised between 5° and 15°.

Such as was specified above, according to one feature of the invention, the primary optical elements of each of the optical modules form one and the same part. Furthermore, the same may go for the secondary optical elements of each of the optical modules. It will be understood that such an arrangement in one part of the primary optical elements makes it possible to facilitate the positioning of these primary optical elements in the optical system with respect to the other components. The mounting operation is simplified and made less expensive, but it should be noted that this operation above all allows the main plane of extension of a primary optical element to be correctly positioned with respect to the plane of extension of the other primary optical element. Thus, and in particular when the secondary optical elements of the two optical modules are also a single part, it is possible to guarantee the projected elementary light beams will superpose correctly.

FIG. 5 schematically illustrates the complementarity of the shapes of the images of the two elementary beams 7, 7' projected by the secondary optical elements 6, 6' as output from the optical modules 1, 1' and that superpose at least partially to create a final pixelated image 9 in a zone of the passenger compartment of the vehicle.

To this end, the light sources 2, 2' associated with the light guides forming the primary members 4, 4' are arranged, respectively, in first and second matrix arrays, which are distinct from each other but of complementary shapes. In other words, the first light guides associated with the first optical module are arranged in a matrix array of X rows and Y columns, here three rows and five columns, in which matrix array the first light guides and the associated first light sources have first locations X, Y, and the second light guides associated with the second optical module are arranged in the same matrix array of X rows and Y columns, here three rows and five columns, in which matrix array the second light guides and the associated second light sources have second locations that are distinct from the corresponding first locations. It is thus possible to define the matrix array of X rows and Y columns as a checkerboard, the arrangement of the first guides of the first optical module corresponding to an occupation of the white squares and the arrangement of the second guides of the second optical module corresponding to an occupation of the complementary black squares. It will be understood that to a first light guide, arranged in the first matrix array, and the location of which is defined by a given row and a given column, there corresponds an empty location in the second matrix array.

As a result of the above, when all the light sources 2, 2' are activated, the shape of the first elementary beam 7 that results from the arrangement of the first matrix array of light sources 2 of the first optical module 1 is the negative of the shape of the second elementary beam 7' resulting from the arrangement of the second matrix array of the light sources 2' of the second optical module 1'.

In the illustrated example and such as may in particular be seen in FIG. 5, when all the first light sources 2 are turned on, the first elementary beam 7 output from the first optical module 1 has a checkerboard configuration that comprises illuminated zones corresponding to the exit faces of the light guides of the primary members 4 and dark zones corresponding to the zones located between the exit faces. Similarly, when all the second light sources 2' are turned on, the second elementary beam 7' output from the second optical module 1' has a checkerboard configuration that is a complementary negative of that emitted by the first elementary beam 7.

As a result, on the output side of the optical system 200, here in that zone of the passenger compartment into which the two elementary light beams that are deviated to superpose are projected, the illuminated zones of the first elementary beam 7 emitted by the first optical module 1 superpose with the dark zones of the second elementary beam 7' emitted by the second optical module 1'. To prevent parasitic dark zones from remaining after superposition of the complementary elementary beams 7, 7' or indeed to prevent any difference in contrast between the complementary illuminated zones, it is possible to increase the emission area of at least one illuminated zone of the first elementary beam 7 so that it partially covers at least one illuminated zone of the second elementary beam 7', said at least one zone neighbouring the dark zone forming the negative of said illuminated zone of the first elementary beam 7. By enlarging the emission area of the illuminated zones, the final image 9 obtained by superposing the elementary beams 7, 7' and projected into the passenger compartment is a complete, uniform and clear image.

The optical system of the interior lighting system 100 according to the invention has the advantage of being flexible. Thus, with a view to increasing lighting functionalities in the passenger compartment, it is possible to control the configuration of the elementary beams 7, 7' in order to diversify the pixelated final image 9, in particular depending on the needs of the users of the vehicle. To this end, provision may be made to combine a first matrix array of primary members 4 of square cross sections of the first optical module 1 with a second matrix array of primary members 4' of round cross sections of the second optical module 1', or indeed to make provision for primary members of different cross sections within a given matrix array.

As a variant, provision may be made to control the light sources 2, 2', in particular by selectively driving the latter. Specifically, individual control of the light sources 2, 2', in particular turn-on or turn-off of light-emitting diodes, allows the shapes, light intensities or colours of the pixels of the elementary beams 7, 7', and therefore of the final pixelated image 9, to be varied. Such driving requires no modification of the optical system according to the invention and allows a diversification of interior lighting functions, it enabling, for example, a logo, a pictogram or a high-definition background image to be projected into the passenger compartment.

The above description clearly explains how the invention allows the objectives that were set therefore to be achieved and in particular how it allows a simplified optical system of low bulk that allows simplified production and implementation of two optical modules placed side-by-side in this optical system, so that each forms a pixelated elementary beam with a view to obtaining a projected pixelated image, to be provided. The optical system according to the invention makes it possible to ensure certain of the optical elements of this system are correctly positioned with respect to each other and thus to improve the definition of the pixelated image projected as output from the system.

The invention is not limited to the embodiments specifically given in this document by way of nonlimiting example, and its scope in particular covers any equivalent means and any technically feasible combination of such means. Thus, features, variants and various embodiments of the invention may be associated with one another in various combinations, provided that they are not incompatible or exclusive of one another. It is in particular possible to imagine variants of the invention that comprise only a selection of the described features, provided that, according to the invention, the optical system comprises two optical modules configured so that two optical elements having the same role each in their optical module are integrally formed.

The invention claimed is:

1. An optical system for lighting a zone of a passenger compartment of a motor vehicle comprising:
    two optical modules, each optical module comprising:
        at least one light source, a first optical element configured to form an elementary beam dependent on the rays emitted by the one or more light sources, and a second optical element for projecting the elementary beam, wherein the first optical elements of the optical modules form one and the same part, and the first optical elements of the optical modules respectively have an optical axis and are arranged so that their optical axes are not parallel to each other.

2. The optical system according to claim 1, wherein each optical module comprises a plurality of light sources that are selectively activatable and members that are respectively arranged facing one of the sources in order to collect and guide the rays emitted by the corresponding source, the first optical element being placed at an exit of the members.

3. The optical system according to claim 2, wherein the members and the first optical elements form one and the same part for the two optical modules.

4. The optical system according to claim 1, wherein the optical modules are configured so that the two projected elementary beams superpose at least partially in the zone of the passenger compartment.

5. The optical system according to claim 1, wherein the optical modules are configured so that the projected elementary beams superpose and have complementary shapes, the shape of a first elementary beam being the negative of the other elementary beam when all the light sources are activated.

6. The optical system according to claim 1, wherein the optical axes of the optical modules are inclined with respect to each other by an angle of value between 0.5° and 3°.

7. The optical system according to claim 1, wherein the second optical elements of the two modules form one and only one part.

8. The optical system according to claim 1, wherein members of a first optical module are arranged to form a first matrix array and members of a second optical module are arranged to form a second matrix array, the first and second matrix arrays being of complementary shapes.

9. The optical system according to claim 1, wherein the optical system comprises an interior lighting system of a vehicle configured to project the elementary beams into at least one zone of the passenger compartment of the vehicle.

10. The optical system according to claim 2, wherein the optical modules are configured so that the two projected elementary beams superpose at least partially in the zone of the passenger compartment.

11. The optical system according to claim 2, wherein the optical modules are configured so that the projected elementary beams superpose and have complementary shapes, the shape of a first elementary beam being the negative of the other elementary beam when all the light sources are activated.

12. The optical system according to claim 2, wherein the second optical elements of the two modules form one and only one part.

13. The optical system according to claim 2, wherein first optical elements of a first optical module are arranged to form a first matrix array and second optical elements of a second optical module are arranged to form a second matrix array, the first and second matrix arrays being of complementary shapes.

14. The optical system according to claim 2, wherein the optical system comprises an interior lighting system of a vehicle configured to project the elementary beams into at least one zone of the passenger compartment of the vehicle.

15. The optical system according to claim 3, wherein the optical modules are configured so that the projected elementary beams superpose and have complementary shapes, the shape of a first elementary beam being the negative of the other elementary beam when all the light sources are activated.

16. The optical system according to claim 3, wherein the optical modules are configured so that the projected elementary beams superpose and have complementary shapes, the shape of a first elementary beam being the negative of the other elementary beam when all the light sources are activated.

17. The optical system according to claim 3, wherein the second optical elements of the two modules form one and only one part.

* * * * *